3,442,715
METHOD OF MAKING DIFFUSION MEMBRANE ELECTRODES FROM VISCO ELASTIC DOUGH

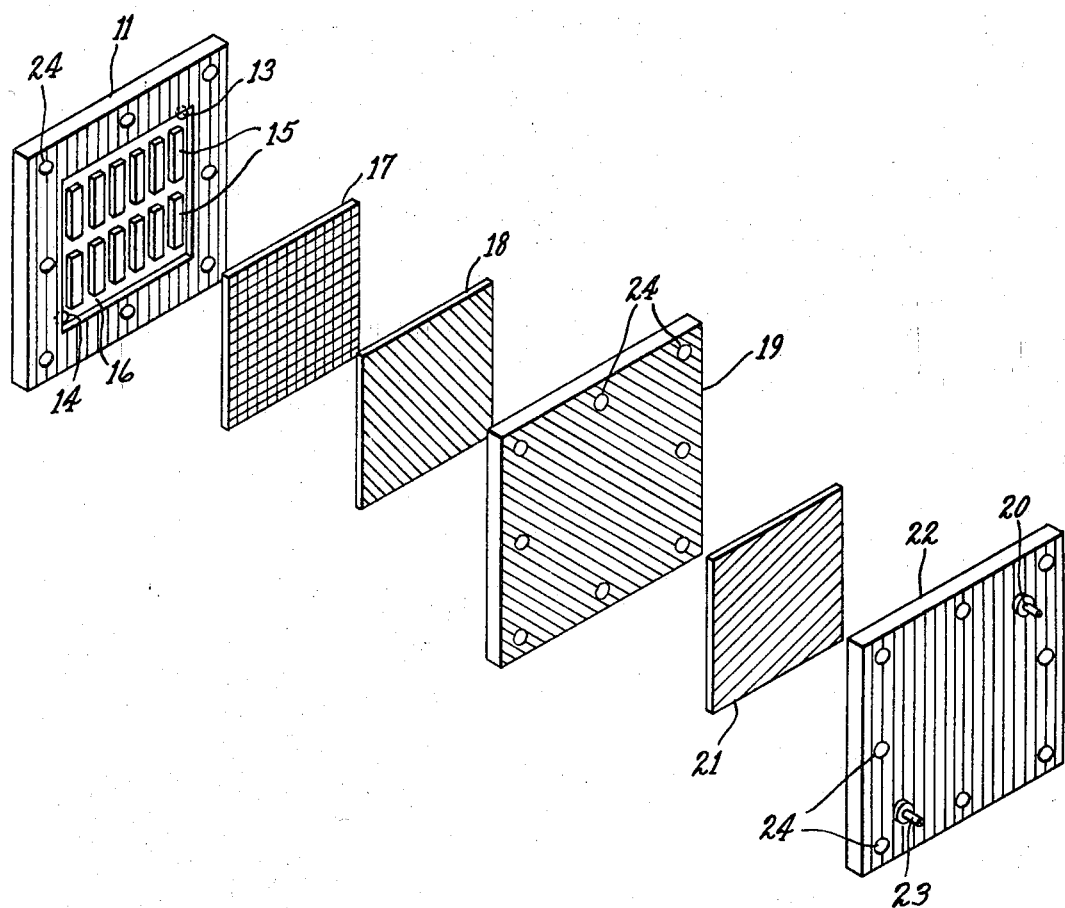

Wung Dai Yee, Framingham, and Max C. Deibert, Needham Heights, Mass., assignors to Monsanto Research Corporation, St. Louis, Mo., a corporation of Delaware
Filed Mar. 1, 1965, Ser. No. 435,827
Int. Cl. H01m 27/06
U.S. Cl. 136—122                                16 Claims This invention relates to electrodes, and more particularly provides a novel method of making a diffusion membrane electrode.

A method is described in the concurrently filed application Ser. No. 435,821, now pending, of Max C. Deibert whereby a diffusion membrane electrode is prepared by mixing a particulate electrode material with an aqueous dispersion of a polymer such as polytetrafluoroethylene, in solids:liquid proportions producing a viscoelastic dough. This is rolled out into a thin membrane, which is cured by drying and heating. The resulting membrane is porous and electrochemically active; it is advantageously adapted for use as a diffusion electrode in cells such as fuel cells, primary cells such as air cells, in electrowinning apparatus and the like.

By an electrode material is meant a conductive material, an electrochemical catalyst, or combinations of the same. By a diffusion electrode is meant a porous electrode through which a cell feedstock (either a fuel or an oxidant) can diffuse to reach the electrode/electrolyte interface, which is where the electrochemical reaction takes place.

The stated particulate electrode material used in making the diffusion electrodes by the novel process may advantageously be a conductive carbon. Membranes prepared from a hydrophobic carbon black and a hydrophobic polymeric binder such as polytetrafluoroethylene are wet-proof and hydrophobic, though they are porous enough to operate as diffusion electrodes. It is usually advantageous for a diffusion electrode to be water-proof, so that there is no gross leakage of water or aqueous solution between the feedstock and the electrolyte, which are separated by the diffusion electrode, and so that the electrode pores will be non-flooding. Carbon is catalytic for some electrochemical reactions, and can be used for example as a cathode in a fuel cell employing an oxidant such as nitric acid or $N_2O_4$. The carbon diffusion electrodes made by the stated novel process are at least as active for this purpose as rigid porous carbon diffusion electrodes made by molding particulate conductive carbon particles into a coherent structure, and have advantages thereover in that they are flexible and not as subject to breakage as are the stated rigid porous carbon diffusion electrodes. Also, the carbon membranes can be combined with other catalysts if desired.

In making electrodes by the stated novel process, the membranes prepared from the viscoelastic dough are usually pressed into a foraminous structure such as a screen prior to being cured. This provides mechanical support for the membranes; it may also decrease the internal resistance of a cell incorporating the electrode, and may serve as a current collector for the electrode. It is usually a screen or mesh of conductive material, generally metal wires or expanded metal, which conducts electricity with less internal resistance than the electrode membrane with which it is placed in contact, and may be referred to as a screen support or screen current collector. The spaces between the meshes permit free passage of the cell components such as feedstock, electrolyte, and so forth, so that they do not interfere with the functioning of the cell.

To obtain good contact between the screen support and the membrane, the membrane is pressed into the screen prior to curing by drying and heating. While the viscoelastic dough is still soft and wet, it can be pressed into the meshes of a metal wire screen so as to form a firm bond with it.

When a carbon diffusion membrane electrode is thus pressed into a screen prior to curing, cracks may appear during the curing process. If the carbon-containing dough is not sufficiently homogeneous, the membrane may show "mud cracking" on drying. It is permeated with a series of deep fissures, extending through from the top of the membrane back to the screen, and its appearance is like that of a dried-up mud flat. Polytetrafluoroethylene dispersions applied to a surface as a film more than a couple of mils thick are known to exhibit mud cracking on drying, and the membranes prepared as described are usually thicker than this. Possibly the cause of such mud cracking is similar in the two cases.

If more time and effort is expended on achieving thorough homogeneity of the dough by mixing until the viscoelastic dough becomes quite stiff, then when the dough is spread into a membrane and the membrane is pressed into a screen, while "mud cracking" may no longer appear, there still are cracking problems. In this case, the cracking which appears may be described as a stress crack.

If the viscoelastic dough made by mixing carbon with a polytetrafluoroethylene aqueous dispersion is rolled out into a membrane and cured without being pressed into a screen, it rarely will crack. However, it shrinks in curing by drying and heating. The shrinkage is fairly substantial: the length and width each decrease by a factor of about 1 part in 6. When the carbon membranes are pressed into a screen before they are dried, the assembly tends to curl up. Presumably this is because the membrane is shrinking and therefore exerting a pull on the screen. If the screen and membrane assembly is flattened, the membrane is stretched and consequently cracks. With very thorough homogenization of a carbon/polytetrafluoroethylene aqueous dough, and slow drying, it is possible to produce membranes mounted on a metal wire screen which are entirely crack-free and flat. However, this prolongs the processing time, and reliable, reproducible electrode production requires careful control of the process.

Excessive mixing to achieve thorough homogeneity of the dough in any case is undesirable. Prolonged and forceful mixing of the dough may result in loss of water by evaporation or thorugh actually forcing part of the water out of the dough, if it is crushed with great force. When undue losses of water occur during mixing, the resulting membrane is insufficiently porous.

It is an object of this invention to provide an improved method of making crack-free diffusion electrodes from a particulate electrode material.

A particular object of this invention is to provide a novel method of making crack-free diffusion electrodes from a mixture of a particulate electrode material and a polymeric binder which, as a viscoelastic dough containing water in the pores, tends to crack on drying.

These and other objects will become evident upon consideration of the following specification and claims.

In accordance with this invention, a particulate electrode material is mixed with a polymeric binder and a substantially organic liquid dispersion medium to form a viscoelastic dough, and the resulting dough is spread to a thin membrane, pressed into a screen support, and cured by drying and heating. It has been found that this procedure produces crack-free electrodes readily and reproducibly with electrode materials which, when the liquid dispersion medium is substantially or entirely aqueous, tend to crack on drying when prepared by the same procedure.

In the description of the invention, reference is made to the accompanying figure, which is an exploded perspective view of a fuel cell construction.

In particular, the use of a substantially organic liquid dispersion medium has been found valuable in the manufacture of hydrophobic diffusion electrodes from carbon black and polytetrafluoroethylene. For example, when the same procedure is followed to prepare a carbon membrane electrode from a concentrated aqueous polytetrafluoroethylene dispersion, employing brief mixing times, but in one case using isopropanol as a diluent and in the other case using water, the product made with water is usually badly mud-cracked. The product made using isopropanol is entirely crack-free.

The use of organic solvents also avoids the appearance of stress cracking in electrodes prepared by pressing the membranes into a screen. The membranes prepared from the polymeric dispersion with an organic diluent do shrink on drying, as measured on membranes cured without being mounted on a screen, but only one-half to one-third as much as the membranes prepared from an aqueous polymer dispersion. Probably, therefore, the membranes mounted on screen supports are not under the same tension on drying, and this may explain their resistance to stress cracking.

Thus the present process represents an advantageous advance in the art of electrode preparation, whereby cracking is avoided while mixing time is minimized.

Referring now to a description of the invention in greater detal, the first step consists of mixing an electrode material with the polymeric binder and a substantially orgnaic liquid dispersion medium to form a viscoelastic dough.

The polymeric binder is preferably initially in a dispersion. The term, dispersion, is used herein to refer to combinations of a polymer and a liquid dispersion medium which may be designated as emulsions, dispersions or suspensions; in any case, the polymer is combined with a liquid dispersion medium so as to remain distributed in it at least briefly after stirring, rather than settling out immediately. Polymeric binders are generally available in dispersion in an aqueous medium: polymerization in an aqueous medium is a usual means for producing polymeric dispersions. If the initial polymeric dispersion is in an aqueous medium, it will preferably contain a fairly high concentration of polymer, such as 10, 25% or more of the polymer by weight of the total, to permit addition of sufficient organic liquid for practice of this invention without unduly diluting the polymer dispersion. If the polymer dispersion initially contains a high content of organic liquid as the dispersion medium, this is so much the better; but the presence of water in the dispersion is not impermissible and indeed, may be advantageous.

When there is water in the initial polymeric dispersion with which the organic liquid dispersion medium is combined, in order to produce a non-cracking mixture in accordance with this invention, enough organic liquid medium will be used to provide at least about 20% by weight of the total liquids content of the mix. Generally, enough of the organic liquid will be introduced so that the combination of this with the liquid in the initial polymer dispersion will produce a preponderantly organic liquid dispersion medium. By this is meant that the liquids content is at least about 50% organic liquid, by weight. The exact preferred ratio of organic liquid to water will vary, depending on the nature of the polymer, the electrode material, the concentration of the polymer, and the like. For preparation of crack-free electrodes from an acetylene carbon black and aqueous polytetrafluoroethylene dispersion, a preponderantly organic liquid dispersion medium, containing between 60 and 80% organic liquid, remainder water, is the preferred liquid dispersion medium.

A wide variety of organic liquids may be used to provide the organic liquid component of the organic liquid-containing dispersion medium with which the polymeric binder is combined. Specifically, for a polymer like polytetrafluoroethylene, available in an aqueous dispersion, a water-miscible organic solvent such as an alcohol is particularly suitable, for example. Various alcohols, both aliphatic and aromatic, and both lower- and higher-boiling than water, have been found suitable for the stated purpose. Exemplary of presently useful aliphatic alcohols are isopropanol, 2-butanol, 2-methyl-2-butanol, isobutanol, n-butanol, 2-pentanol, 3-pentanol, 3,3-dimethyl-2-methyl-1-butanol, 3-methyl-1-butanol, 3-hexanol, 2-hexanol, 1-hexanol, 3-ethyl-3-pentanol, 2-methyl-1-pentanol, 3-methyl-1-pentanol, 4-heptanol, 2-heptanol, 2,4-dimethyl-1-pentanol, 2-methyl-1-hexanol, 2-ethyl-1-pentanol, 2,6-dimethyl-4-heptanol, 1-heptanol, 2-octanol, 2-ethyl-1-hexanol, 1-octanol, tert-butyl alcohols, and so forth. The presently useful aliphatic alcohols also include cycloaliphatic alcohols such as cyclopentanol, 2-methyl-cyclohexanol, 3-methyl-cyclohexanol, 2,4-dimethylcyclohexanol, 3,3-dimethylcyclohexanol, cyclohexanol, and the like. The aromatic alcohols useful in the practice of this invention are exemplified particularly by aralkyl alcohols such as benzyl alcohol, 3-methylbenzyl alcohol, p,α-dimethylbenzyl alcohol, 1-phenyl-n-propyl alcohol, 2-phenethyl alcohol, 3-phenylpropanol, phenyl n-hexyl carbinol and the like. In general, the stated alcohols are hydrocarbons free of aliphatic unsaturation, having hydroxy substituents on aliphatic carbon atoms, and containing up to 16 carbon atoms, but the useful organic liquids are not limited to those of the stated nature. Aqueous dispersions of polymers including polytetrafluoroethylene can also be diluted with glycols and with amino alcohols (U.S. 2,937,-136), exemplary of which are 1,2-ethanediol, 1,2-propanediol, 1,3-propanediol, mixtures of glycerol and ethylene glycol, diethylene glycol, glycerol, ethanol amine, glycerol alpha-monomethyl ether, diethanol amine, triethanol amine, glycerol alpha-monochlorohydrin, monacetin, diethylene glycol monobutyl ether, diethylene glycol monoethyl ether, and the like. Still other substances with which dispersions of polymers including polytetrafluoroethylene may be combined include the normally liquid paraffin hydrocarbons such as pentane, hexane, heptane, or octane, aromatic hydrocarbons such as benzene, toluene, xylene, cycloaliphatic hydrocarbons such as cyclohexane, and low-, medium- and high-boiling mineral oil fractions which may include mixtures of paraffins, naphthenes and aromatics. Indeed, the organic liquid used may comprise halogenated hydrocarbons such as carbon tetrachloride or trichloroethylene, a polydimethylsiloxane (viscosity 100 centistokes), a perfluorocarbon oil, B.P. 150–170° C./10 mm. Hg, and still other types of organic liquids.

Mixtures of organic liquids such as those above listed may also be employed.

Certain compounds such as ethylene glycol, ethylene glycol monoethyl ether, diethylene glycol diacetate, diethylene glycol, diethyl ether, ethyl lactate and acetone are reported to coagulate polytetrafluoroethylene dispersions to some extent, and thus may be less suitable than the above-mentioned compounds as diluents for such dispersions. However, coagulation and precipitation of polytetrafluoroethylene from its concentrated aqueous dispersions is observed to occur even on addition of organic liquids such as isopropanol or an isopropanol/benzene mixture, which are useful in accordance with this invention, so that coagulation or precipitation of the polymer by the organic liquid employed is not necessarily an indication of non-utility.

In some cases, the initial polymeric dispersion, whether it is entirely aqueous or already contains an organic solvent, may contain or advantageously have added thereto a dispersing agent. The types of dispersing agents employed in making concentrated aqueous dispersions of polytetrafluoroethylene have been reported to be for example an alkali metal or ammonium salt of an acid of formula H(CF₂CF₂)₃₋₁₀COOH, a saturated $C_{12}$ or higher hydrocarbon, generally aliphatic, a fluorine-containing compound such as 1,2-dichlorotetrafluoroethylene, and so forth. Aqueous dispersions of polytetrafluoroethylene, for example, are readily available: see, thus, U.S. 2,478,229; British 642,045; U.S. 2,534,058; U.S. 2,662,065, and other patents. The dispersions including organic solvents sometimes advantageously include surfactants such as lauryl sulfate, an ether of a phenol with a polyethylene glycol, and the like (see U.S. 2,613,193), alkyl aryl sodium sulfonates, sorbitan, salts of the higher fatty acids and their polyoxyethylene derivatives, and so forth.

Polytetrafluoroethylene is a particularly preferred polymer, but the present invention is not limited thereto. Methods are known for producing dispersions of other polymers in aqueous dispersion: for example, as taught in U.S. 2,559,752 for the production of chlorotrifluoroethylene polymer dispersions. It is usually desirable to use a hydrophobic polymer, but hydrophilic polymers are sometimes useful: hydrophilic diffusion electrodes may be desirable in some circumstances. Actually, the hydrophobic or hydrophilic character of the presently provided electrodes may be controlled, it has been found, by the nature of the electrode material in it. Even when the polymer is hydrophobic, like polytetrafluoroethylene, use of an electrode material like Pt produces a moderately hydrophilic membrane, while an electrode material like a hydrophobic carbon black produces a membrane which is hydrophobic.

Broadly, presently suitable hydrophobic polymers include any polymers having a low surface energy (which is characteristic of hydrophobicity) that will remain stable under fuel cell operating conditions (which may include heat, such as operating temperatures of 90° C. or higher, and contact with corrosive chemicals, such as acids, alkalies and oxidants). Such polymers include polymers of various halogen-substituted hydrocarbon monomers, particularly fluorine-substituted olefinic monomers. Halogen polymers that may be employed include polymers of fluorocarbons and substituted fluorocarbons wherein one or more fluorine atoms are replaced by hydrogen, chlorine, or bromine, such as polytetrafluoroethylene, polytrifluoroethylene, polyvinyl fluoride, polyvinylidene fluoride, polytrifluorochloroethylene, and copolymers of different fluorocarbon monomers such as polymers of tetrafluroethylene and hexafluoropropylene. Fluorocarbon polymers have been reported to be far superior to other polymers for improving electrode performance, particularly as to wet-proofing electrodes.

Other hydrophobic and various hydrophilic polymers may, however, be used. Hydrocarbon polymers having a molecular weight in the range of 50,000 to 1,000,000 or more, having a free surface energy close to or below that of polyethylene, are suitable for hydrophobic electrode membrane formation. Among these are polymers and copolymers of ethylene, propylene, 3-ethyl-1-butene, 4-methyl-1-pentene, and 4,4-dimethyl-1-pentene. Silicone polymers are also suitable as hydrophobic polymers. Examples of other contemplated polymeric binder materials include polyvinyl butyral, polystyrene-butadiene, polyamides of hexamethylene diamine and adipic acid (nylon), polymethyl methacrylate, polyvinyl ethers such as the methyl ether, polyvinyl acetate and its partially hydrolyzed derivatives, cellulose derivatives such as methyl cellulose ethers, polyvinyl alcohol and so forth.

The polymer dispersion and the organic liquid dispersion medium are mixed with a particulate electrode material, either separately or as a dispersion in which sufficient organic liquid is present or has been added to produce a substantially organic liquid dispersion medium.

The particulate electrode material used will include an electrically conductive material, and may include an electrochemical catalyst. The conductive material and the catalyst may be one and the same material, or combinations of conductive and catalytic materials may be used. Conductive carbon can be used as a conductive catalyst, by itself, in some systems, or as a conductive and hydrophobic diluent for catalytic electrode materials such as platinum. Because cracking is a particular problem with screen-mounted membranes of viscoelastic doughs prepared from an aqueous polymer dispersion and a particulate electrode material containing 20–100%, by volume, of a conductive carbon, the present invention particularly contemplates the preparation of electrodes from electrode materials, particularly catalysts, as well as combinations least about 20% of the electrode material volume. However, similar difficulties with cracking may be encountered with other particulate electrode materials such as metals, metal oxides, and the like, and contemplated electrode materials which may be made into diffusion electrodes by the present process include a variety of other electrode materials, particularly catalysts, as well as combinations of conductive materials such as carbon or metals with such catalysts. For catalysis of cathode reactions, it is possible to use noble metals such as gold, silver, platinum, palladium, rhodium and the like. (Group VIII in the Periodic Table, Periods 5 and 6) or metal oxides, such as combinations of nickel oxide and lithium oxide. The anodic reaction in a fuel cell may be catalyzed by a metal of Groups I–B, V–B and VI–B and VIII of the Perodic Table such as chromium, tungsten, molybdenum, cobalt, nickel, gold, silver, copper, platinum, palladium, rhodium, iridium, other metals such as manganese and inorganic compounds containing one or more of such metals such as nickel oxide, manganese oxide, cobalt molybdate, vanadium pentoxide, and the like.

Conductive carbon used in making an electrode according to the invention is preferably an acetylene black, which is sometimes called a battery black because of its excellent conductivity. Furnace carbon blacks are also conductive, and other conductive carbons may be used; also, the carbon used may be either hydrophobic or hydrophilic, porous or non-porous.

The particle size of the electrode material should generally be low, suitably below about 1 micron. By this is meant the ultimate particle size: sometimes fine particulate materials are obtained as aggregates of the fine particles, and the aggregates have a large particle size, but break down into the individual particles on mixing with shearing, which the present process involves. Particularly good results are obtained in the present method with electrode materials having an average particle size below one micron and usually below about 0.05 micron; usually these materials have a very high surface area, which enhances their electrochemical activity. However, at least part of the electrode material may consist of larger size particles, particularly filamentary materials. For example, fibers may be included of a conductive material such as carbon, which are 0.35 to 0.45 mil in diameter and about 0.25 inch long. The dispersed polymer particles may, for example, have a particle size of about 0.2 micron; in general, the polymer particle size will be in the range of about 0.1 to 15 microns, with a size in the range of 0.1 to 1.0 micron generally preferred.

The proportion of polymer to the electrode material is desirably kept as low as possible: at too high a ratio of polymer to electrode material, the electrode porosity decreases, and also the activity of the catalyst in the electrode is diminished, probably because the polymer covers part of the catalyst. However, with insufficient polymer, the electrode lacks mechanical strength, and may lose solid particles when it is flexed or abraded after drying. Precise optimum ratios depend on the nature of the polymer and factors such as particle size of the particulate electrode material. In general, the weight ratio of polymer to particulate electrode material will be in the range of from 5 to 1 to 1 to 20. For polytetrafluoroethylene, the presently preferred polymeric binder, the weight ratio of polymer to electrode material is generally in the range of from 2:1 to 1:10, and with hydrophobic carbon having a particle size of about 0.04 micron, a suitable ratio is about 1:1.

The ratio of the solids (polymer plus electrode material) to the liquid phase of the mixture and the mixing will be such as to produce a viscoelastic dough, having a rubbery texture such that it can be stretched and elongated to a certain extent without breaking, but retaining its shape after deformation with sufficient force. The initial mixture may vary in consistency: the hydrophobic carbon/polytetrafluoroethylene dispersion mixes are initially dry and powdery, but with other electrode materials, the initial mix may instead have a pasty consistency. However, in any case, on continued mixing, with the correct solids:liquid ratio, the mix will agglomerate and form a coherent lump of dough. The liquid content should be such that, after sufficient mixing, a dough is produced which is a viscoelastic material, mixing of which involves shearing forces such that the particles are forced into contact with one another while being moved past each other.

Assuming sufficient mixing, the solids:liquid ratio determines the resulting structure. With a very high volume of liquid in proportion to solids, the mix is a paste. By a "paste" is meant a mixture of a consistency which will spread rapidly under gravitational forces on surfaces like glass. This type of loose paste does not agglomerate into a viscoelastic dough, even on continued mixing and application of shearing. Drying and heating such a paste produces a fragile structure with high pore volume. A mixture of the particulate electrode material and dispersed polymer with a somewhat lower liquid content, after application of shearing forces to produce homogeneity of the mixture, will hold together in a coherent mass that may be described as a dough, but which is not elastic or extensible, fragmenting when pulled rather than stretching. A somewhat lower liquid content than this is required to form the elastic and extensible viscoelastic type of dough which is contemplated in accordance with the present invention. If still less liquid than this is present as the liquid dispersion medium, the mix of polymer and electrode material will form a rubbery dough which can be spread to a membrane. However, as a result of the low liquid content, after drying, this membrane has little or or no porosity. Liquid content is therefore to be maximized as far as possible, while still producing a rubbery, elastic dough. Specific useful ratios are dependent on the particular system in question. In any case, the amount of liquid to be employed may be described as the maximum which can be included while producing a dough of viscoelastic consistency, which can be determined experimentally.

The mix should be made as homogeneous as possible. The mixing is to be continued not only until the mix has cohered into a viscoelastic dough, but subsequently, until this dough has become quite stiff. A correctly proportioned mix not mixed well enough will lack mechanical strength after curing, or indeed, may crack in curing. The mixing process is conducted under conditions in which shearing forces are applied. For large batches, suitable mixing equipment is exemplified by a Banbury mixer or a differential roller mill, as employed in rubber processing. In smaller batches, the mixing may be produced by procedures including stirring, grinding in a mortar with a pestle, rolling and folding, and the like, or combinations of such procedures. The rolling and folding technique consists of rolling out the dough into a membrane (a structure with a thickness which is small compared to its length and width), folding this back into a lump, and rolling this out again into a membrane, repeatedly.

After complete mixing, the dough is shaped into a thin membrane. The present viscoelastic dough cannot simply be compressed under high pressure to flatten it: if this is done, excessive amounts of liquid are driven out from the dough, and driven out unevenly, leaving thin areas and breaks in the flattened product. However, it has been found that the rubbery dough can be spread into a flattened thin membrane without substantial loss of liquid, by applying gentle pressure with means exerting both vertical and lateral spreading forces, such as by rolling out the dough. This gives a membrane of even thickness, which is free of breaks and which contains essentially all of the liquid content of the dough. The resulting membrane is flexible and tough, and can be handled freely: it is self-supporting, for example.

To avoid having the membranes stick and tear as they are formed from the dough, it is usually desirable to protect the dough from direct contact with the compressing and spreading pressure-imposing surfaces, by interposition of a layer of a non-wetting surface. For example, the dough may be enclosed between sheets or films of a polymer such as polyethylene, polypropylene, polytetrafluoroethylene or the like while it is being spread by rolling.

The thickness of the membrane formed from the dough will be approximately that of the cured electrode membrane. The electrode will usually be below about 30 mils thick, and may be thinner, down to 3 to 5 mils or less. Usual means for controlling thickness of sheets formed by compression and spreading may be used, such as stops at the height of the desired thickness preventing further downward motion of the compressing and spreading agent.

The stated membrane may, if desired, be combined with a second membrane to produce a laminar structure as described in the concurrently filed application S.N. 435,936 now pending of Max C. Deibert relating to preparation of laminar electrodes.

In essence, preparation of a laminar structure consists of following the above-described process steps to prepare two or more rolled-out membranes comprising particulate electrode material, dispersed polymeric binder, and a liquid dispersion medium, in the form of a viscoelastic dough. These membranes may or may not all comprise an organic liquid in the liquid dispersion medium: the liquid dispersion medium in one may, for example, be substantially or entirely aqueous. The dispersed polymeric binder in it may be a binder such as one of those described hereinabove and is preferably polytetrafluoroethylene. The particulate electrode material in it may be any electrode material including a conductive material, such as those described hereinabove, and may or may not include a conductive hydrophobic or hydrophilic carbon. If it does include any substantial amount of carbon, the membrane is advantageously prepared with an organic dispersion medium as described above.

The membranes formed from the viscoelastic doughs are assembled by pressing them together, preferably prior to complete curing. They may be pressed together as they are rolled out into membranes, or after being formed into separate membranes, either before or after partial desolvation, produced by air drying, for example. Pressures like those used in rolling out the membranes, such that liquid is not forced out of the membranes to any substantial degree, are suitable for pressing the membranes together into the laminar structure sufficiently to provide adherence. Usually a screen current collector will be pressed into the surface of the assembly, and the procedure for this is like that for assembling a single membrane with a current collector, as discussed below. The laminar assembly, containing two layers of membranes of viscoelastic doughs, is then cured by heating, which curing procedure is generally the same as described further hereinafter for curing a single membrane in accordance with this invention.

As will be appreciated, the electrode materials and the polymers in the individual membranes of the laminar assembly may be the same or different. When one electrode material is a wettable particulate material such as a platinum black, it may be advantageous to use a liquid dispersion medium for the polymeric binder which is aqueous or substantially aqueous, although this may alternatively be a substantially organic liquid dispersion medium, as described hereinabove. When the liquid dispersion medium is aqueous, the solids:liquid ratio adapted to produce a viscoelastic dough on mixing is generally of the order of the ratios discussed above, and in any case, adapted to form a viscoelastic dough. A Pt-polytetrafluoroethylene aqueous dispersion mix is apt to be a paste, initially, as compared to the initially dry nature of a carbon/polytetrafluoroethylene liquid dispersion mix, but on continued mixing, it agglomerates into a coherent, rubbery, viscoelastic dough to which shear forces can be applied in mixing to homogenize the dough.

The stated laminar electrodes are especially advantageously made by assembling a hydrophobic carbon membrane prepared by the method of this invention with a membrane containing a metallic catalyst such as platinum black. The latter is expensive, and can be conserved by laminating a very thin membrane of it to a second membrane made of a less expensive electrode material like carbon black. The resulting laminate, after curing, has substantially the activity of the metallic catalyst component, while containing less of it than would be needed to make a usefully strong membrane of electrode thickness entirely from the metallic catalyst. It generally has higher catalytic activity, for electrochemical reactions catalyzed by the metallic catalyst, than a non-laminar membrane prepared from a mixture of the same amounts of the metallic catalyst and carbon black, combined with a polymer dispersion to form a viscoelastic dough. Moreover, whereas a membrane electrode made from a metallic catalyst like Pt alone is wettable, the laminate with the hydrophobic carbon membrane is hydrophobic, and impermeable to aqueous liquid phase transfer. The wetproof properties of the resulting laminar electrode are especially desirable and advantageous in fuel cells operating with electrolytes where water is present. As will be appreciated, laminates with another catalyst than Pt in one layer, may also have the stated advantages, and indeed, there may be advantages even when the laminated membranes have the same composition, whereby an interface is provided within the electrode.

The membranes, either individually or as a laminate of more than one membrane, will be adhered to a foraminous support or current collector prior to curing, such as a screen or mesh of conductive metal wires. A mesh size of from 20 x 20 to 100 x 100 (openings/inch) made with a 2-10 mil wire is usually satisfactory. The screen is advantageously applied to the membranes by laying the screen on the membrane and applying pressure, with a roller or the like, to force the membrane (which is still a flexible soft dough) into the meshes of the screen.

The membrane (or membrane laminate) is now ready to cure. The curing procedure involves drying and heating. By heating to cure the membrane is meant application of controlled elevated temperatures, above room temperature, to the membrane, to complete its drying and to produce mechanical strength by softening the polymer enough to stabilize the electrode structure. Part of the drying process may precede heating.

To avoid cracking during the curing process, it has sometimes been found desirable to remove the majority of the liquid by drying through evaporation, without heating. The drying can be conducted by exposing the membrane to the air at a room (70° F.) temperature and in an atmosphere having a relative humidity somewhere below 100%, such as in the range of 30 to 75%. The amount of care necessary in the drying depends somewhat on the dispersed particulate material in the membrane electrodes. The membranes in which the electrode material consists essentially or carbon black of fine particle size may crack if liquid is removed too rapidly. Room temperature drying may be omitted altogether in some cases, particularly where subsequent heating is gradual and slow; where it is used, for membranes prepared from a substantially organic liquid dispension as provided by this invention, typical room temperature drying times are 1 or 2 hours.

The electrode is in any case heated to dry it completely by removing liquid components of the mix, and to stabilize the membrane structure. The heating preferably follows a gradual schedule, in which the temeperature is raised by stages from room temperature to the ultimate heating temperature. This ultimate temperature will be high enough to remove substantially all the liquid content from the membrane, leaving a product consisting essentially of a porous membrane of electrode material and polymeric binder. For electrodes prepared from polytetrafluoroethylene, this ultimate temperature may be 300-325° C., for example. To cure the membrane electrode thoroughly, and make a durable product which does not tend to separate from the screen or flake off under subsequent mechanical stress, such as encountered in use in a cell, it is necessary to heat the membranes to this extent, it has been found. It will be noted that the stated temperature is below the sintering temperature of polytetrafluoroethylene, which is about 327° C. The membranes may be heated to above the sintering temperature, but this is not necessary and indeed heating to substantially above the sintering temperature may be disadvantageous, causing a decrease in catalytic activity.

As will be appreciated, if another polymer is used as the binder instead, the temperature will be appropirately adjusted to avoid melting or decomposing the polymer. In general, the dough will be heated to a temperature below the melting point of the polymeric component, but enough to cause it to soften. Heating above the temperature needed to drive off components of the membrane other than the polymer and electrode material appears to be desirable, to form a strong membrane. The higher temperatures can be regarded as having the effect of stabilizing the contact points of the polymer with the electrode material. However, having the polymer flow so that it may cover the electrode material is undesirable: it should just be softened.

Cure of the present membranes is conducted by drying and heating at or below ambient (atmospheric) pressure. It is characteristic of the present process that strong electrode structures which are impermeable to gross liquid flow, and which transmit liquids such as water at most through fine capillaries, if not only in the vapor phase, rather than as a freely flowing liquid stream, are formed during heating at atmospheric pressures or below. High pressures may be applied to the membranes subsequent to curing if desired, by cold-pressing to decerase the porosity still further, for example; but this is not needed to make the cured membranes impervious to gross liquid flow.

Application of moderate vacuum during the curing cycle is usually desirable. Besides helping to evaporate the liquid from the membrane electrode, it assists in removing any dispersing agent present. The initial polymeric binder dispersion may be the source of this dispersing agent. Heating will usually remove it, but an active catalytic electrode material like platinum black may cause such rapid decomposition of organic dispersion agents at elevated temperatures as to produce disintegrtaion of the membrane. Application of vacuum in one of the intial heating stages of the curing cycle helps prevent this. Moderate vacuum such as pressures down to about 50-0.1 mm. Hg is usually sufficient.

When the cure is complete, the residual membrane electrode structure consists essentially of the polymeric binder and dispersed electrode material; the liquid component of the original dough should have been substantially completely removed, along with any dispersing agent. It may be used as is for an electrode, or further treated if desired. For example, it is is not hydrophobic, it may be desirable to waterproof it, for example by means known in the art such as application of a hydrophobic polymer such as polytetrafluoroethylene. If it is not catalytic for a particular electrochemical reaction, it may be coated with a catalyst, using electroplating or a like process, and so forth.

For use, the cured membrane electrode is mounted in a cell such as a fuel cell. As those skilled in the art know, a fuel cell is a device for the generation of electrical energy in which a combustible fuel and an oxidant are supplied to a cell system including two electrodes separated by an electrolyte during operation of this cell. An individual fuel cell is ordinarily made of of a cell container, two conducting electrodes each including a catalyst for the desired electrochemical reaction, means for introducing a fuel to the anode, an electrolyte, and connecting means associated with each electrode (cathode and anode) for establishing electrical contact with an external circuit. Usually a battery of fuel cells, connected in series or parallel, is required for supplying the power needed to operate electrically actuated equipment.

Fuel cells may employ diffusion electrodes, immersion electrodes, or combinations thereof. If one of the feedstocks, fuel or oxidant, is soluble in the electrolyte and can pass through it to reach the opposite electrode, at which it is not intended to react, that electrode usually must be an immersion electrode, that is, be selectively catalytic for the electrochemical reaction which it is intended to catalyze. While the present electrodes are referred to herein as diffusion electrodes, depending on their catalytic selectivity and hydrophobic or hydrophilic character, they may operate as immersion electrodes. In this case, electrolyte may be fed into this system with one or more of the feed stocks, reaching the electrolyte between the electrodes by flowing around or through the electrode.

Also, it will be appreciated that the presently provided novel electrode structures need not provide both the electrodes of the cell. If desired, one electrode may thus be a structure already known in the art. However, inasmuch as this invention provides electrodes adaptable for use both in anodes and cathodes, advantageous results are obtained by making both the electrodes in accordance with this invention.

In operation of fuel cells employing electrodes as provided herein, the nature of the fuel, oxidant and electrolyte may vary. Suitable fuel and oxidant feedstocks may include materials which are either liquid or gaseous at the operating temperatures of the cell. Examples of useful fuel feedstocks are gases comprising hydrogen, such as those produced by reforming hydrogen sources such as hydrocarbons, dimethyl hydrazine or the like, hydrazine, hydrocarbons such as propane or methane, oxygenated hydrocarbons such as alcohols like methyl or ethyl alcohol, ketones such as acetone, aldehydes such as formaldehyde, carboxylic acids such as formic acid, and so forth. Examples of suitable oxidants include oxygen, gases comprising oxygen such as air, dinitrogen tetroxide, nitric acid and so forth. Suitable electrolytes such as aqueous solutions of $H_2SO_4$, $H_3PO_4$, HCl, $HNO_3$, perchloric acid and other strong acids, solutions of strong bases such as KOH, NaOH, LiOH and so forth, aqueous carbonate electrolytes such as $K_2CO_3$-$KHCO_3$, $Na_2CO_3$, molten salts and so forth. An ion exchange membrane may be used as electrolyte, also, if desired.

As illustrative of fuel cell construction, reference may be made to the figure, which represents a fuel cell in exploded perspective view. In the figure, the cell end plate 11 contains an inlet port 13 and an outlet port 14 and manifold brackets 15 in recess 16 for directing flow of a feedstock (such as oxygen) through recess 16. In the assembled cell, the feedstock will pass through diffusion electrode (anode) 18 and through screen current collector 17, to reach electrolyte contained in electrolyte holder 19, which may be, for example, an asbestos mat saturated with aqueous KOH as the contained electrolyte. Excess feedstock and products may exit by diffusion back through current collector 17 and anode 18 into recess 16 and exit through outlet port 14. A similar arrangement exists for inlet of a fuel feedstock such as hydrogen, for example, through inlet port 20 in end pltae 22, to diffuse through cathode 21, reaching contained electrolyte 19; any rejected vapors exit back through outlet port 23 in end plate 22. Bolt holes 24 are used for the introduction of the bolts, not shown, to hold the assembly together.

The electrodes of this invention may be embodied in a primary cell, for example, by placing a block of an anodic metal such as zinc and an electrode suitable for use as a cathode such as a carbon membrane electrode into contact with an electrolyte such as aqueous caustic, arranged so that the face of the cathode away from the electrolyte is exposed to air. Connection of the zinc anode and the membrane cathode to an external circuit will produce electrical power. Such cells may be stacked, with separators such as corrugated metal plates above each cathode to permit access of air to the cathode, and arrangements may be included to blow air through the cells or release oxygen into the cathode compartments. The electrodes of the invention may also be embodied in a cell to which power is supplied, rather than one supplying electrical power: for example, they may be embodied in a concentration cell for electrowinning oxygen, wherein the electrodes are each, for example, planar conductive membranes having an electrochemical catalyst such as platinum, on the surface facing an electrolyte contained between them, which may be aqueous KOH, for example. The sides of the electrodes away from the electrolyte are exposed to differing concentrations of a cell feedstock such as oxygen, and the electrodes are connected to an external power source such as a dry cell, so that the direction of flow of electrons is towards the electrode exposed to the lower concentration of the oxygen. The source of the latter may be oxygen dissolved in water, for example, with a hydrophobic membrane electrode exposed thereto. This electrowinning cell will extract dissolved oxygen from water or extract oxygen from air and supply an oxygen-rich stream.

The invention is illustrated but not limited by the following examples.

*Example 1*

This example illustrates preparation of an electrode in accordance with this invention, using a hydrophobic carbon, an aqueous polymer dispersion, and an organic diluent.

The aqueous dispersion of polymer employed is a dispersion of polytetrafluoroethylene ("Teflon" dispersion 852–201), which is believed to be an emulsion as described in U.S. Patent 2,613,193, containing about 5%, by weight of the total, toluene, about 2%, by weight of the total, of surfactants such as lauryl sulfate and an alkylaryl polyalkylene oxide ether, the remainder being the polymer and water, in approximately a 1:1 weight ratio. The average polymer particle size in this emulsion is reputedly about 0.2 micron.

18 grams (g.) of 100% isopropanol are added to 12 g. of the polytetrafluoroethylene aqueous dispersion. The mixture is stirred and then added to 6 g. of Shawinigan carbon black, which is a conductive acetylene black with a particle size of about 0.04 micron. The mixture is stirred with a spatula for a few minutes, and then ground in a mortar with a pestle for a few minutes. It becomes a rubbery coherent dough during this grinding. The resulting dough is placed on a flat surface between 2 flexible sheets of polypropylene and a cylindrical hand roller is used to roll it into a thin strip about 10 by 2 by ⅛ inches. This is folded into a lump and rolled out again, the folding and rolling operation being repeated 4 times. By the final time, the mixture is stiff and it requires forceful pressure to roll it out. About a quarter of the resulting product is separated from the remainder and rolled out to a square membrane about 4 inches on a side, and about 15–20 mils thick. A 60 by 60 mesh stainless steel screen square of about the same dimensions is laid over the rolled-out membrane and pressed into the membrane surface with a roller, between the polypropylene sheets.

To cure the membrane, it is now dried and heated. The drying is effected by storing it open to the air, at usual ambient room conditions (about 60–80% humidity and 65–75° F.) for an hour. Careful examination fails to detect any cracks in the surface. The assembly is now cured by heating in an oven at 80° C. for one hour, and finally in an oven at 300–325° C. for an hour. (The vacuum applied in this and succeeding examples draws to a nominal 10 torr.)

The product is a very strong flexible sheet, which can be bent, twisted and flexed without separating from the screen backing or dislodging particles. A drop of water placed on the surface will roll around on it without spreading or wetting the membrane: it is, however, porous to gas or vapor. It is entirely crack-free.

For comparison, the same procedure is repeated using the same polymer dispersion and the same carbon, in the same ratios (6 g. of carbon to 12 g. of dispersion), but diluting the polymer dispersion with 1 g. of water. The same procedure is followed, brief stirring, grinding in a mortar and pestle until the mixture becomes a coherent dough, and repeated rolling-out, folding-together and rolling-out again into a membrane. A quarter of the final membrane is taken, rolled out into a square membrane about 4 inches on a side and 15–20 mils thick, and pressed into a screen as described above. When this membrane is exposed to air under the same conditions as the isopropnaol membrane, by the end of one-half hour's exposure to the air, the membrane is badly mud-cracked, with fissures throughout the surface of the carbon membrane, extending through down to the screen current collector.

Example 2

This example illustrates practice of the invention with a mixture of organic solvents.

A 12 gram portion of the polytetrafluoroethylene dispersion described in Example 1 is mixed successively with 9 g. of 100% isopropanol and then 9 g. of benzene. The mixture is stirred together, and then added to 6 g. of the carbon black described in Example 1. The resulting mixture is stirred vigorously for several minutes and then ground in a mortar and pestle for about 5 minutes, when it has become a coherent rubbery dough. The dough is placed between polypropylene sheets and spread into a thin membrane with a roller as described in Example 1. This folded into a lump and rolled out again, the folding and rolling-out operation being repeated 4 or 5 times, until the viscoelastic dough has become as stiff as the repeatedly rolled-out membrane made with isopropanol as described in Example 1. A quarter of this mixture is rolled into a 15–20 mil thick membrane about 4 inches on a side as described in Example 1, mounted on a screen, and air-dried and heated to cure it, as described in Example 1. The product is similar in its physical properties and hydrophobicity to that produced with isopropanol as described in Example 1. It is entirely crack-free.

Example 3

This example illustrates utilization of an electrode prepared as described in Example 3 in a cell.

Homogeneous "carbon rubber" membranes of carbon in an aqueous suspension of polytetrafluoroethylene diluted with isopropanol and benzene, are prepared as described in Example 2. A 30 x 30 mesh stainless steel current collector is rolled into the surface of one of these membranes. The current collector and the membrane are each squares about 4 inches on a side. The screen-mounted carbon membrane is air-dried for about a half hour, and then a second membrane of the same carbon rubber, of about the same dimensions, is pressed into the carbon rubber-covered side and the assembly is dried by storing it open to the air at about 75% humidity and about 65° F. room temperature for an hour. Next it is heated in an oven at 80° C. for one half hour, then placed in an oven at 150° C. under vacuum for one hour, and finally in an oven at about 300° C. for one hour. The completed carbon cathode assembly is 20 mils thick.

To prepare a laminar platinum anode, for use as the anode in a cell with the above-described cathode, a platinum-containing dough is produced by adding 2 g. of water to 0.4 g. of the polytetrafluoroethylene dispersion in Example 1, and mixing 2 g. of Engelhard platinum black into the diluted dispersion. The resulting mixture is stirred until it agglomerates into a coherent dough, thoroughly homogenized by application of shearing force, and finally rolled out into a thin membrane. A square of 80 x 80 mesh stainless steel current collector, 3 to 4 inches on a side, is pressed into this membrane. The platinum-covered side of this product is covered with a second membrane, of about the same dimensions, made by mixing 2 g. of Pt black, 0.4 g. of the aqueous polytetrafluoroethylene, 1.5 g. of water and 0.5 g. of isopropanol, to form a viscoelastic dough. The assembly is now pressed together by rolling pressure, after which it is cured by air drying at room temperature for an hour, and heating ½ hour at 80° C., 1 hour under vacuum at 150–155° C., and 1 hour at 300° C.

The above-described electrodes are placed with the screen-coated faces contacting a separator consisting of 5 M phosphoric acid gelled by addition of a silica gel ("Santocel" FR-C) in the amount of about 15% by weight of the total (acid plus silica gel). The electrodes and electrolyte are clamped between end plates which have inlet and outlet ports for admission of anolyte and catholyte to the anode and cathode respectively, corresponding essentially to the cell assembly illustrated in the figure. The anode is supplied with an anolyte of one molar hydrazine and 5 molar phosphoric acid, and the cathode, with a catholyte of 5 molar phosphoric acid, while current is drawn from the cell by connection of the anode and cathode to an external circuit. With the cell at 45–90° C., at a current drain of 6.0 amperes, the cell delivers a steady potential of 0.35 (at 45°) to above 0.4 (at 75–90°) volts.

The cell is operated for a number of hours with the above-identified cathode and anode feeds, cycling between open circuit and current drains up to 12 amperes, and then, retaining the anolyte feed of 1 molar hydrazine and 5 molar phosphoric acid, the cathode feed is switched to $N_2O_4$ and operated with this as oxidant. The cell, at a temperature of 65–80° C., delivers 0.6 volts at a current drain rate of 6 amperes, and 0.4–0.5 volts at current drain rates as high as 14 amperes. The cell operates for a total of 150 hours at 6 amperes current drain without significant polarization, sustaining a steady 0.6 volt output.

Example 4

This example illustrates practice of the invention with different solvents.

The procedure described in Example 2 is repeated, on a one-half scale (that is, using one half the amounts stated in Example 2) and substituting 4.5 grams of isoamyl alcohol for the isopropyl alcohol, addition of this to a 6 gram portion of the polytetrafluoroethylene dispersion being followed by addition of 4.5 grams of benzene. Three grams of the carbon described in Example 1 is mixed with the diluted polymer dispersion, and the procedure of mixing, grinding, and repeatedly rolling out described in the examples above is followed to produce a viscoelastic dough, half of which is rolled out into a membrane. A platinum membrane is prepared by mixing 2 g. of Engelhard platinum black, 0.4 g. of the above-described polytetrafluoroethylene aqueous dispersions, and 2 g. of water. This mixture is stirred until it agglomerates into a viscoelastic dough, which is then rolled out repeatedly to subject it to shearing stress and homogenize it. Finally a quarter of the dough is rolled out into a membrane of about the same dimensions as the carbon membrane, and this platinum membrane is placed on the carbon membrane and pressed into it, by rolling pressure applied with the membrane layers enclosed between sheets of polypropylene film. A screen current collector is laid over the platinum side of the laminate, and the assembly is pressed together, while protected by polypropylene sheets, by rolling pressure. The resulting product is cured by air-drying and heating as described in the above examples. The resulting electrodes are flexible, strong, smooth and crack-free, and they are useful as electrodes in a fuel cell.

*Example 5*

This example describes utilization of electrodes prepared as described in Example 4.

A cell assembly is employed corresponding essentially to that illustrated in the figure. The separator is an asbestos sheet. The carbon/platinum electrode prepared as described in Example 4 is employed as the cathode, with the screen side placed against the separator. For use as the anode, a porous nickel plaque 25 mils thick is plated on one side with palladium black, in a concentration of about 10 mg. Pd/sq. in. This is placed with the Pd-coated side against the electrolyte-containing separator, and the electrodes and separator are clamped between end plates providing feedstock compartments on the sides of the electrodes away from the separator. The exposed electrode areas are 9 square inches, even.

Oxygen is fed to the cathode feedstock compartment, and 3 M hydrazine in 5 M KOH is supplied as the anode feedstock, while connections are made from the current collectors of the respective electrodes to an external circuit which places a current drain of 3 amperes on the cell. Under this load, the cell delivers a steady voltage of above 0.8 volt during operation for a period of 25 hours.

*Example 6*

A mixture of 9 g. of isoamyl alcohol with 6 g. of the polytetrafluoroethylene dispersion described in Example 1 is added to 3 g. of the carbon described in Example 1, and the mixture is made into a homogeneous viscoelastic dough by stirring, rubbing in a mortar and pestle, and folding in and rolling out the dough repeatedly as described above. Half of this dough is spread into a membrane. A quarter of the viscoelastic dough prepared from 2 g. of Pt black, 0.4 g. of the polytetrafluoroethylene dispersion and 2 g. of water as described in Example 4 is made into a membrane which is pressed into the carbon membrane, after which a screen current collector is pressed into the laminated membranes, and the assembly is cured by heating, following the procedure described in Example 4.

The resulting platinum-on-carbon electrode is used as the cathode in a cell employing an anode, electrolyte, and anode and cathode feedstocks as described in Example 5. This cell also delivers above 0.8 volt at a 3 ampere current drain, throughout continuous operation of the cell for 3.5 hours.

*Example 7*

The procedure of Example 6 is followed, substituting benzyl alcohol for the isoamyl alcohol. The resulting laminar platinum-on-carbon electrode is used as the cathode in an oxygen-fed cell employing hydrazine as the fuel as described in Example 5. At a 3 ampere current drain, this cell delivers about 0.75 volt during continuous operation for 4 hours.

*Example 8*

The procedure of Example 4 is repeated, to prepare a platinum-on-carbon electrode, but substituting 4.5 grams of benzyl alcohol for the isoamyl alcohol of Example 4. The electrode is used as cathode in a cell as describd in Example 5. This cell delivers over 0.8 volt during continuous operation at a 3 ampere current drain for 4 hours. The current drain is then increased to 6 amperes, and continued at this level for an additional 17.5 hours, during which the cell voltage is sustained at 0.7 volt.

*Example 9*

This example illustrates preparation and testing of an electrode using larger particle size electrode material.

A mix is prepared of the following composition:

| | G. |
|---|---|
| Shawinigan carbon black as described in Example 1 | 3.84 |
| "HITCO" carbon filament, 0.35–0.45 mils diameter, about ¼-inch long (min. 94% C) | 0.96 |
| Polytetrafluoroethylene dispersion as described in Example 1 | 14.4 |
| Anhydrous isopropanol | 9.0 |
| Anhydrous benzene | 9.0 |

This mixture is stirred, ground, and repeatedly folded together and rolled out until it forms a viscoelastic dough. Somewhat more liquid is lost from this mixture in this process than in working up a similar mixture wherein the particulate electrode material consists entirely of the fine particle size carbon black. After a viscoelastic dough has been formed, the mixture is divided into quarters, and two of these portions are each rolled out into a membrane in the shape of a square about 4 inches on a side. One of these membranes is placed on top of the other, and they are pressed together with a roller, and then a square of stainless steel 60 x 60 mesh screen is rolled into the surface of the laminar membrane assembly. The resulting assembly is dried by exposure to air for about an hour, heated ½ hour at about 80° C., an hour at 150° C. under vacuum, and an hour at 300–325° C., to cure it. The resulting laminar membrane electrode is strong, flexible and hydrophobic but porous to gas.

To provide an anode for use with the cathode prepared as stated above, two viscoelastic doughs are made by combining 2 g. platinum black with 0.4 g. of the polytetrafluoroethylene dispersion described in Example 1 and 2 g. of water. A first of these doughs is rolled out into a membrane about 4 x 4 inches square, and a 60 x 60 mesh stainless steel screen square of about the same dimensions, which has previously been sprayed with a diluted dispersion of polytetrafluoroethylene made by adding 90 g. of water and 5 g. of isopropanol to the 50% polytetrafluoroethylene dispersion described in Example 1, heated at 300° C. for about 15 minutes, sprayed again with this dispersion, and again heated at 300° C. The assembly of screen and membrane is air-dried for 15 minutes, while 0.2 g. of isopropanol is mixed into the second of the platinum-containing viscoelastic doughs, and the resulting stiff dough is rolled out into a membrane. A square of stainless steel screen treated as described above is rolled into the latter membrane and the resulting assembly is combined with the first assembly of platinum-containing membrane and screen, with the two membranes placed face-to-face. The four-layer assembly of two screens and two membranes is cold-pressed at 1500 p.s.i. (which produces little loss of liquid), and then air-dried for an hour, heated at 80° C. for an hour, and heated at about 150° C. for one hour under vacuum. The assembly is kept under vacuum overnight, at ambient temperature, and then the cure is completed by heating at 300° C. for an hour, at atmospheric pressure.

The cathode and anode prepared as stated are placed in frames which leave a square 3 x 3 inches of the electrodes exposed, and the screen-covered sides are placed against a separator made by gelling phosphoric acid with a silica aerogel, as described in Example 3, which is spread on an electrode screen surface in the electrode frame, in a layer about ⅟₁₆-inch thick, and the other electrode and frame laid over it to contain the electrolyte. The electrodes and separator are clamped between end plates including anolyte and catholyte chambers, as illustrated in FIGURE 4, and a flow of $N_2O_4$ gas is passed through the chamber behind the carbon laminar membrane cathode, while a solution of 3 M hydrazine in 5 M $H_3PO_4$ is pumped through the anolyte chamber. The cell is heated to 90° C., and the electrodes are connected to an external circuit drawing a current of 6 amperes (100 amperes per square foot). The cell potential is sustained at 0.35 volt for 45 minutes operation at this current drain level.

While the invention has been described with particular reference to specific preferred embodiments thereof, it will be appreciated that modifications and variations can be made without departing from the scope of the invention as disclosed herein, which is limited only as indicated in the following claims.

What is claimed is:

1. In the method for making a diffusion membrane electrode which is a continuous network of interconnected polymer particles coated with electrode materials, which method comprises the steps of:
    (1) forming a homogeneous viscoelastic dough by mixing a particulate electrode material comprising at least about 20% by volume of a conductive carbon electrode material with a polymeric binder and a liquid dispersion medium in proportions including about the maximum liquids:solids ratio producing a rubbery viscoelastic dough,
    (2) spreading the dough into a viscoelastic membrane of electrode thickness without substantially changing the liquid content of said dough, and
    (3) heating said membrane to cure it;
the improvement wherein said liquid dispersing medium includes an organic liquid medium in an amount equivalent to at least about 50% by weight of said liquid dispersing medium.

2. The method of claim 1 in which the said carbon is hydrophobic.

3. The method of claim 1 in which the substantially organic liquid dispersion medium includes water.

4. The method of claim 1 in which the said polymeric binder is polytetrafluoroethylene.

5. The method of claim 1 wherein said membrane is pressed into a foraminous structure before heating the membrane to cure it.

6. The method of claim 1 wherein the polymeric binder is initially in the form of a dispersion in a liquid dispersion medium.

7. The method of claim 4 in which the organic liqiud dispersion medium comprises an aromatic hydrocarbon.

8. The method of claim 4 in which the said organic liquid medium comprises a mixture of an alcohol and an aromatic hydrocarbon.

9. The method of claim 4 in which the organic liquid dispersion medium comprises an alcohol.

10. The medium of claim 9 in which the said alcohol is an alkyl alcohol.

11. In the method for making a diffusion membrane electrode which is a continuous network of interconnected polymer particles coated with electrode materials, which method comprises the steps of:
    (1) forming a homogeneous viscoelastic dough by mixing a particulate electrode material comprising at least about 20% by volume of a conductive carbon electrode material with a dispersion of polytetrafluoroethylene in an aqueous dispersing medium in proportions including about the maximum liquids:solids ratio producing a rubbery viscoelastic dough,
    (2) spreading the dough into a viscoelastic membrane of electrode thickness without substantially changing the liquid content of said dough, and
    (3) heating said membrane to cure it;
the improvement wherein an organic liquid dispersing medium comprising an alcohol is included in said dispersion of polytetrafluoroethylene in an amount sufficient to provide at least about 50% by weight of the total weight of said aqueous and organic dispersing mediums.

12. The method of claim 11 in which said organic liquid dispersion medium comprises an alcohol and an aromatic hydrocarbon.

13. The method of claim 12 in which isopropanol is the alcohol and benzene is the aromatic hydrocarbon.

14. The method of claim 13 in which the combined weight of isopropanol and benzene is greater than the weight of the aqueous dispersion of polytetrafluoroethylene.

15. The method of claim 11 in which the said electrode material consists essentially of carbon.

16. The method of claim 15 in which said carbon is a hydrophobic carbon black.

References Cited

UNITED STATES PATENTS 3,252,839  5/1966  Langer et al. _____ 136—86

WINSTON A. DOUGLAS, *Primary Examiner.*

O. F. CRUTCHFIELD, *Assistant Examiner.*

U.S. Cl. X.R.

136—86, 120, 121; 264—29, 104, 105